United States Patent [19]

Nakazawa et al.

[11] 3,992,700

[45] Nov. 16, 1976

[54] INFORMATION RETRIEVING APPARATUS

[75] Inventors: Tamotu Nakazawa; Kenzoh Ina, both of Yokohama; Takashi Minagawa, Tokyo, all of Japan

[73] Assignee: Canon Kabushiki Kaisha, Tokyo, Japan

[22] Filed: May 19, 1975

[21] Appl. No.: 578,421

[30] Foreign Application Priority Data
May 21, 1974 Japan............................. 49-56937

[52] U.S. Cl. ............................................. 340/172.5
[51] Int. Cl.² ......................................... G06F 13/00
[58] Field of Search..................... 444/1; 340/172.5

[56] References Cited
UNITED STATES PATENTS
3,636,520  1/1972  Berteau................................ 445/1

*Primary Examiner*—Edward J. Wise
*Attorney, Agent, or Firm*—Fitzpatrick, Cella, Harper & Scinto

[57] ABSTRACT

An information retrieving apparatus comprises a memory having a plurality of records stored therein which are formed with weights attached to items of information, a reader for reading the stored information out from the memory, input means for entering an interrogation to be checked with the information in the memory, comparing means for detecting coincidence between the information read out by the reader and the signal, discrimination means for determining, in accordance with the coincidence detected by the comparing means, the weight of the information read out by the reader which is coincident with the interrogation, and selector means for selecting, in accordance with the weight decided by the discrimination means, a certain item of information from the record to which the information coincident with the interrogation appertains.

10 Claims, 6 Drawing Figures

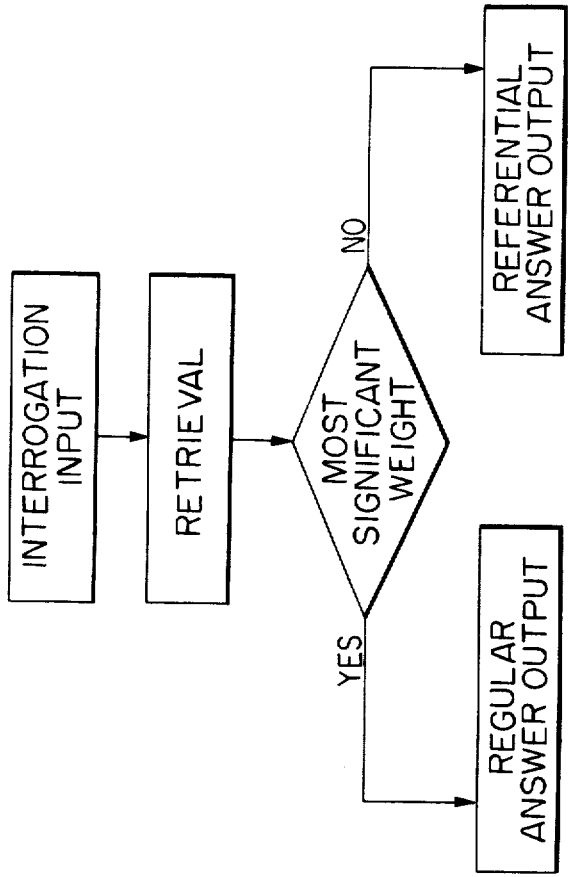
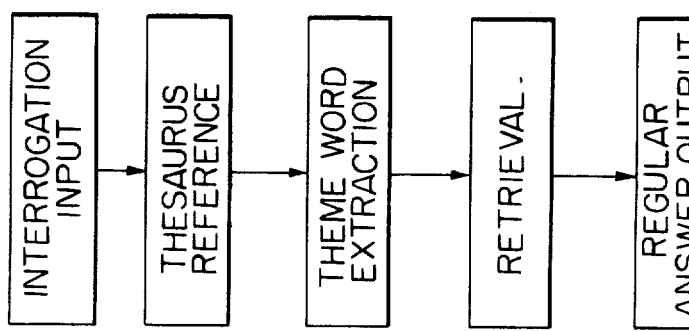
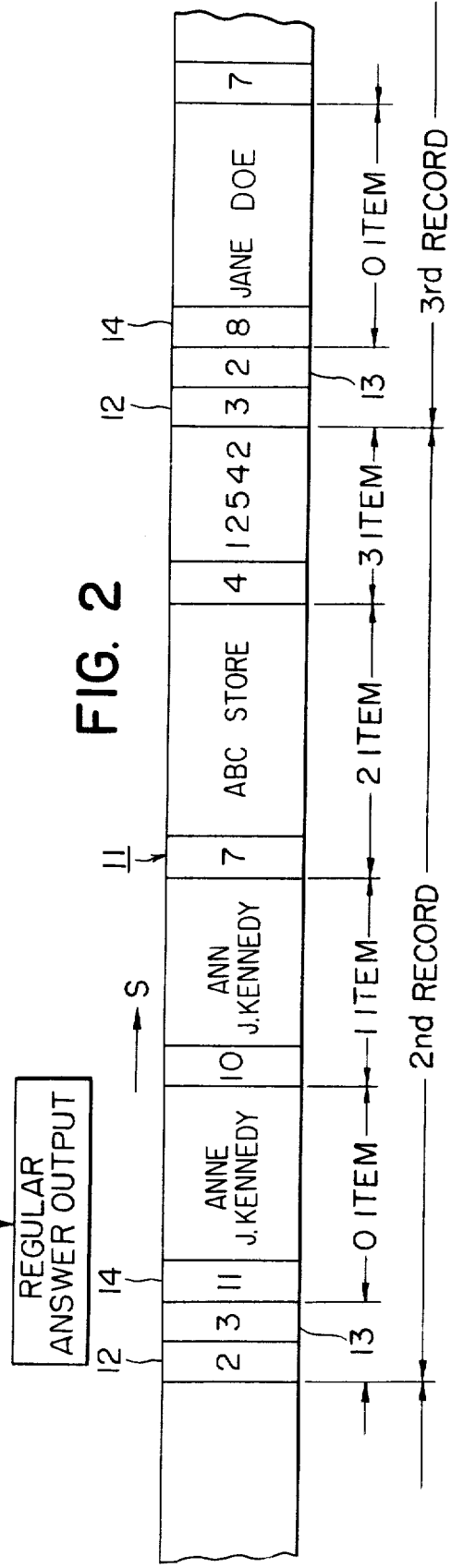

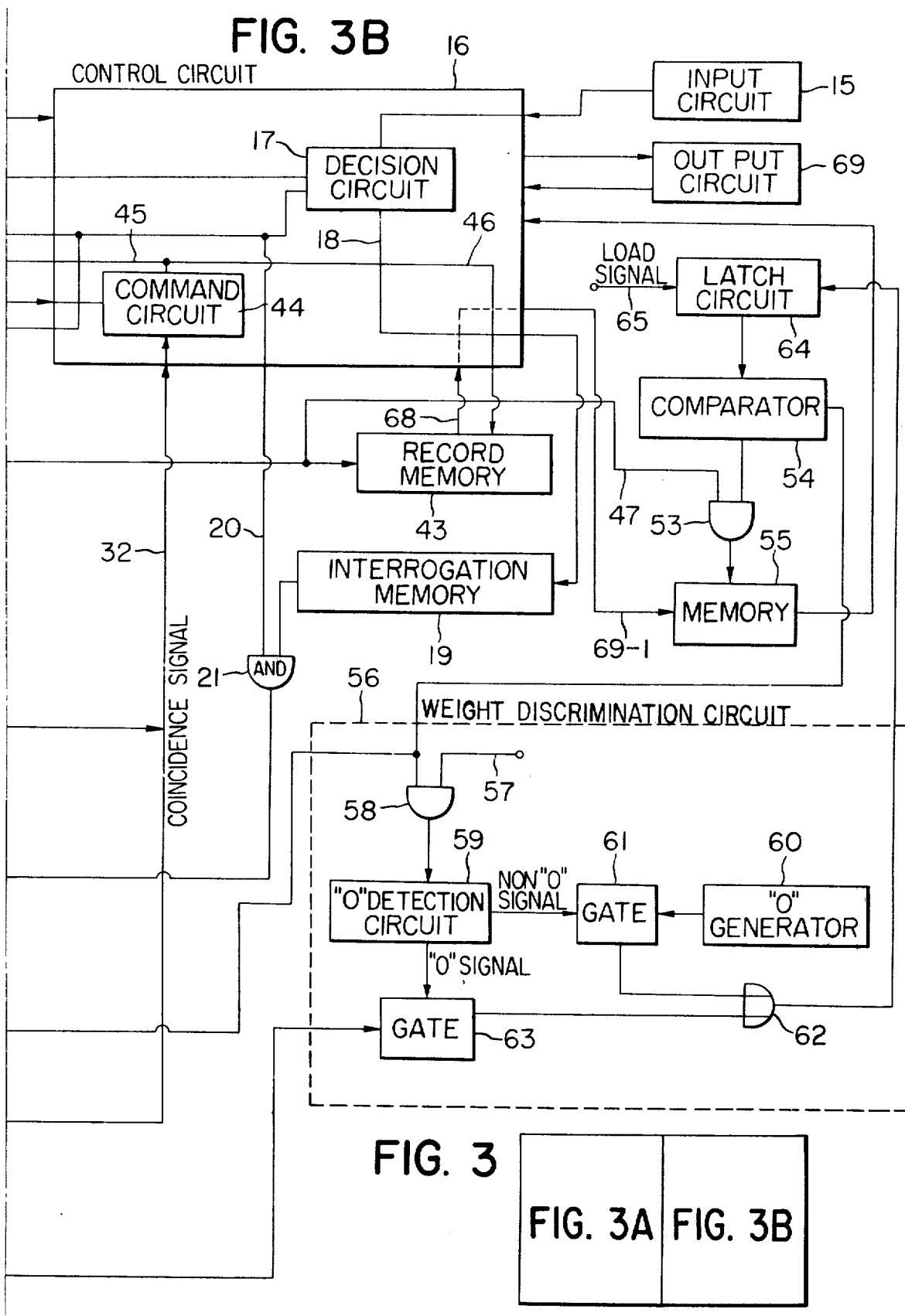

INFORMATION RETRIEVING APPARATUS

BACKGROUND OF THE INVENTION

1. Field of the Invention

This invention relates to an information detecting apparatus for detecting an item of information corresponding to an entered specific item of information, from within a memory having multiple items of information stored therein.

2. Description of the Prior Art

In an information retrieving apparatus for detecting a certain specific item of information from within a memory having multiple items of information stored therein, it is easy to compare each of the stored items of information with the specific item of information to derive a corresponding result. However, if the information stored in the memory consists of a natural language, retrieval must be effected after the specific item of information entered for retrieval has been converted into the same language as the information stored in the memory.

For such purpose, most retrieving apparatuses using a natural language to effect retrieval have been equipped with a thesaurus, with the aid of which the natural language has been converted into a mechanical language and, thereafter, retrieval has been effected.

Such thesaurus has required much time and labor to prepare and, moreover, words falling within one category (a group of synonyms) have been converted into one kind of mechanical language. This has made it difficult to make distinctions between items of information within the one category.

Further, assume that there are words A1, A2, A3, . . . all falling within one category, and words B1, B2, B3, . . . Bn falling within another category. Even if there is the relation that A1=Bn, the use of A1 for retrieval has only enabled retrieval of the information falling within category A and the use of Bn for retrieval has only enabled retrieval of the information falling within category B.

More specifically, with the retrieval systems according to the prior art, as shown in the flow chart of FIG. 1(A) of the accompanying drawings, an interrogation is entered into the information retrieving apparatus and such interrogation has reference to a thesaurus within the apparatus. The interrogation is converted into a header word, with the aid of which answer information is put out from a memory having multiple items of information stored therein. Such answer information has been one which corresponds to the interrogation not directly, but through the header word.

SUMMARY OF THE INVENTION

It is therefore an object of the present invention to present an information retrieving apparatus which eliminates the necessity of converting an interrogation into a mechanical language by the use of a thesaurus.

It is another object of the present invention to present an information retrieving apparatus which, if unable to derive a regular answer, can effectively put out other items of information.

It is still another object of the present invention to present an information retrieving apparatus which will derive, as referential information, some item of information having a possible relation with the interrogation even if the interrogation is not coincident with the information in the memory, as an answer.

It is yet still another object of the present invention to present an information retrieving apparatus which can easily put out the most effective referential information when the information coincident with the interrogation is not retrieved.

Other objects of the present invention will become more fully apparent from the following detailed description of the invention taken in conjuncton with the accompanying drawings.

BRIEF DESCRIPTION OF THE DRAWINGS

FIGS. 1(A) and 1(B) are flow charts of the retrivel sytems according to the prior art and the present invention, respectively.

FIG. 2 illustrates the manner in which information is contained within a memory used with the present invention.

DESCRIPTION OF THE PREFRRED EMBODIMENTS

Figure 3A:
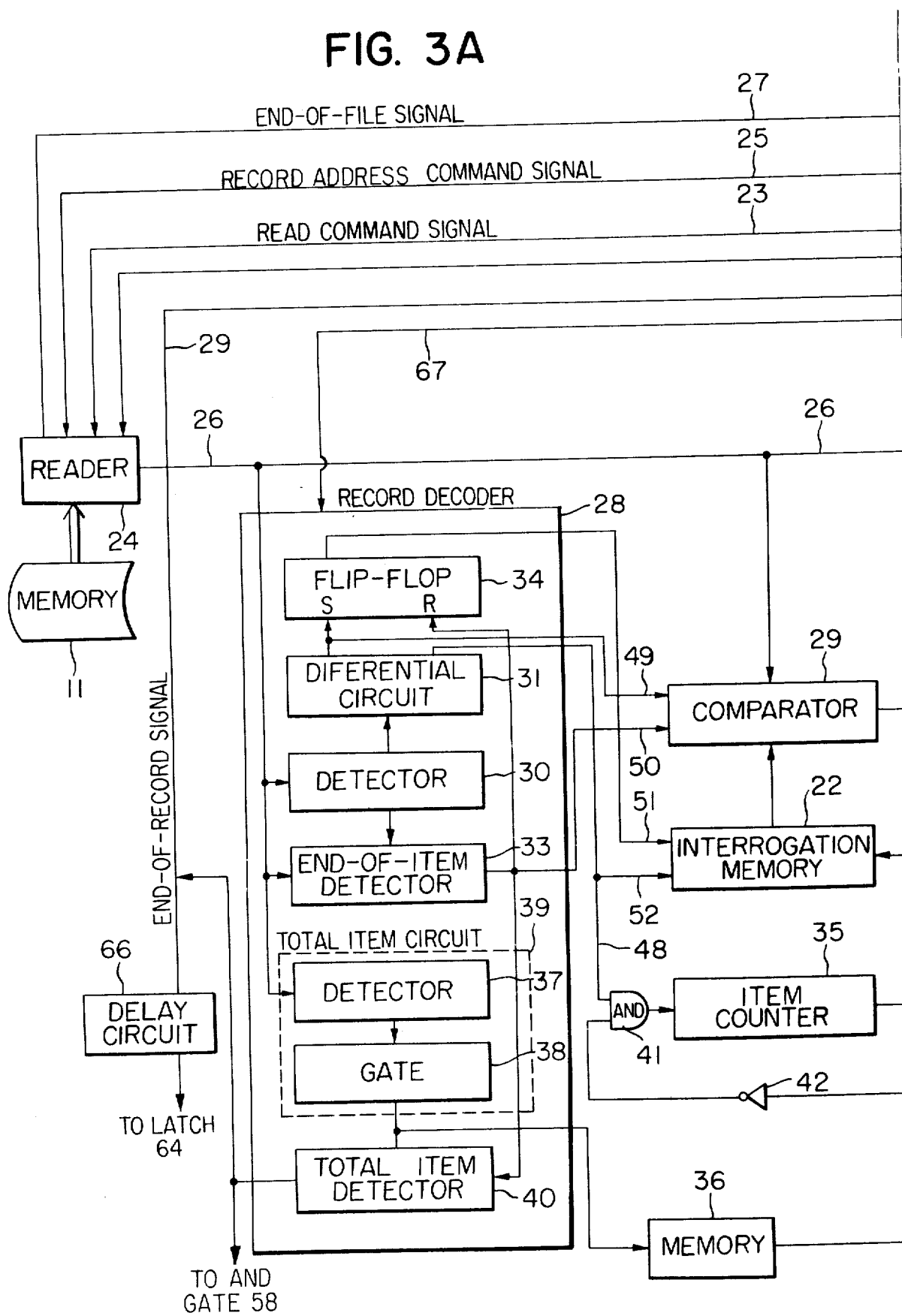
FIG. 3, comprising 3A and 3B, is a block diagram of the information retrieving apparatus according to the present invention.

Referring to FIG. 1(B) a simple flow chart shows a retrieval system applicable to the information retrieving apparatus according to the present invention, whereby upon entry of interrogation into the apparatus, the stored information in a memory may immediately be retrieved without the interrogation being converted into a header word and, when a corresponding item of information has been retrieved, an answer is provided not directly, but only after a weight possessed by the corresponding information is first identified That is, a regular answer is given when the weight is the most significant one and a referential answer, distinct from the regular answer, is given when the weight is not the most significant one.

Therefore, in accordance with the present invention, an interrogation and an answer may directly correspond to each other and the contents of the answer are controllable by the weight, so that any desired information can be derived accurately.

The invention will now be described more particularly with respect to an embodiment thereof which is applicable as an account number retrieving machine for use in banking or like services. Money exchange between a bank and a customer having an account with the bank is usually out through the number of the account. Actually it is often the case with such account in the bank that a certain action such as payment or the like is done with the name, house name or address or the customer, rather than the number of the account itself, indicated exactly. This imposes on the part of the bank the necessity of retrieving the number of the account through the name, house name, company name, telephone number, address or other referential information concerning the customer.

Utilized for such purpose is the account number retrieving machine whose memory stores therein information in a form, for example, as shown below.

Table 1

| ECORD | HEADER WORD | ACCESSORY WORDS | ACCOUNT NUMBER |
|---|---|---|---|
| 1 | ANN. J. KENNEDY | MANAGER OF CANON K.K. | 12345 |
| 2 | ANNE. J. KENNEDY | ANN. J. KENNEDY ABC STORE | 12542 |
| 3 | JANE DOE | ABC STORE | 13279 |

As particularly regards "ANNE" (this may be pronounced as "ANN"; in case of this portion, the formal elling happens to be "ANNE"), the account number 12542" corresponds to a regular answer and the ader word "ANNE. J. KENNEDY " has the most gnificant weight, while the accessory word "ANN.J. ENNEDY" has the second most significant weight d "ABC STORE" also has the second most significant weight.

Further, the RECORD in Table 1 above refers to formation which appertains to one and the same oup.

Therefore, if information having the most significant eight is coincident with the interrogation, a regular swer, namely, the account number, is put out. If formation having any other weight which is coincident with the interrogation has been retrieved, no regular answer is provided but the information having the ost significant weight is put out as referential information. Thus, one can determine whether or not the formation exactly coincident with the interrogation is ored and what information similar to the interrogation is stored. Examples of the interrogation which may e made to the memory shown in Table 1 and examples f the answers thereto will be shown below.

Table 2

| ITERROGATION | ANSWER |
|---|---|
| NNE. J. KENNEDY | 12542 |
| ANAGER OF CANON K.K | ANN. J. KENNEDY |
| NN. J. KENNEDY | 12345 and ANNE. J. KENNEDY |
| BC STORE | ANNE. J. KENNEDY and JANE DOE | hus, the interrogator may trust the answer as having a gular answer with respect to those cases where the ccount number is put out, but the interrogator must -confirm the interrogation with respect to those cases here the answer is put out in the form of characters.

Although not shown in Table 2 above, if no corresponding information is stored in the memory, either o answer will be put out or an output indicating that o corresponding information is stored will be put out.

An embodiment of the present invention will hereinfter be described with reference to FIGS. 2 and 3. esignated by 11 is a memory such as magnetic tape or agnetic disc having multiple items of information ored therein in such a manner, for example, as shown 1 FIG. 2. At a position 12 on an information track to e retrieved in the direction of the arrows, there is ontained an index signal comprising a particular code dicative of the fact that a certain record is contained record index zone), and at a position designated by 3, there is contained the number of items (types of formation) included in said record, such number eing a number as counted from 0 and thus, being less y 1 than what it actually is (total item containing one). At a position indicated by 14, there is contained he number of characters included in the leading item hich is the item corresponding to "0", such number being a number as counted from 0 and accordingly being less by 1 than what it actually is. At the next position, there is an item of information, for example, "ANNE J. KENNEDY" (character number containing zone). Subsequently to such information, there is contained the number of the characters included in the next item, i.e. a first item. In this manner, various types of information are contained successively, with a regular answer, namely, the account number, being contained in the last item. Thus, the information about the aforementioned account number 12542 is contained in the manner as shown in FIG. 2, and such second record is followed by a third record. Thus, a plurality of records are contained in the memory 11. The weight of each item of information is such that the item corresponding to 0 has the most significant weight, the first to $n-1$ th items equally have the second most significant weight, and the n—th item of the record is that which contains the regular answer.

FIG. 3 is a block diagram of a retrieving apparatus for retrieving any desired information from a memory which stores information in the manner as shown in FIG. 2. Designated by 15 is an input device including keys such as input keys for entering the information to be retrieved and a retrieval start command key. A signal generated from the input device upon operation of an unshown information input key is applied to a control portion 16, whereby a decision circuit 17 decides that the input is an information input, whereafter the key-entered interrogation is introduced from the control portion through a line 18 into an interrogation memory 19 which may comprise shift register or the like. Thereafter, the retrieval start command key (not shown) of the input device 15 is operated to apply a retrieval command to the control portion 16 and, thereby, the decision circuit 17 decides that this command is a retrieval command. A retrieval start command signal is applied therefrom through a line 20 to an AND gate 21, so that the contents in the interrogation memory 19 are transferred to a second interrogation memory 22. The second interrogation memory 22 should preferably employ RAM to permit comparison to be repeatedly effected if the length of the interrogation is not constant. The reason is that in such RAM, reading-out of the information contained in an address is effected by indicating that address and, therefore, reading-out of interrogation may be started always from the same condition by effecting the address reset prior to the reading of interrogation. On the other hand, by the other part of the output of the decision circuit 17 which has decided that the retrieval start command from the input device 15 has been applied, a read command signal is applied from a line 23 to a reader 24 while a record address memory command signal is applied from a line 25. The reader starts to read the information out from the memory 11 and the information thus read out is derived on a line 26, whereby the number of the position of the record which has started to be read is stored in an unshown circuit within the reader 24. The purpose of so storing the read start record position is to apply an end-of-file signal to the control portion 16 through a line 27 for causing an unshown circuit to detect and inform that all the information in the memory 11 has been retrieved.

Designated by 28 is a record decoder circuit which derives various signals from the record information introduced thereinto through the line 26. One of these signals is a comparison start command signal on a line 49 for starting the comparing action of a comparator 29 which compares the content of the interrogation memory 22 with the information from the line 26 and, when they are coincident with each other, holds the coincidence signal until one record comes to an end (said comparison start command signal is derived when the character number containing zone 14 which is the first position in each item has been passed through, or in other words, in the first place of character information). Formation of such comparison start command signal may be accomplished by detecting the character number containing zone, introducing into a differential circuit 31 the output from a character number containing zone detector circuit 30 which provides a high-level signal during the period of time when such zone is being read, and thereby causing only a differential pulse in the negative direction to be produced from the differential circuit.

Alternatively, the character number containing zone detector circuit 30 may be designed such that it detects a signal pre-recorded in the zone 14 within the memory 11 to enable such zone to be identified, or that the detector effects detection for a predetermined length of time after the total item containing zone 13 has passed.

Another of said various signals is a result determination command signal for determining the result of the comparison effected by the comparator 29 and derived on a line 50 which leads out a coincidence signal onto the line 32 when the interrogation is in coincidence with the information in the memory 11 (said result determination command signal is derived after the end of each item). Such result determination command signal may be derived from an end-of-item circuit 33 which causes the information read on the line 26 to be gated by the output of the character number containing zone detector circuit 30 to thereby cause character number information to be obtained and stored, and thereafter subtracts 1 from the character number each time one character is read out, and which derives an output when information on the same number of characters is detected.

If a special signal is pre-recorded in the last place of each item in the memory 11, then the end-of-time detector circuit may be a circuit for detecting such special signal.

Still another signal is a read continuation command signal which is derived on a line 51 to indicate the time for reading out the information in the interrogation memory 22 at a speed synchronous with the information derived from the reader 24 (said still another signal is derived for the period of time during which the character information in each item is being read out). Such signal may be derived from the set output of a flip-flop 34 which receives the output of the differential circuit 31 as set input and the output of the end-of-item detector circuit 33 as reset input.

Yet still another signal is an address reset signal which is derived on a line 52 to reset an address indicating the interrogation to its initial condition within the interrogation memory 22 after comparison of a certain item with that interrogation has completed but before comparison of the contents of a subsequent item with that interrogation is effected. Such signal may be provided by the output signal of the differential circuit 31 which will further be described.

A further signal is an item signal which is derived on a line 48 upon start of an item to enter an item number into an item counter 35 which counts the item number (this counter being adapted to start counting from 0) in order to determine the number of the item being then retrieved. Such signal may be provided by the positive output signal of the differential circuit 31.

A further signal is a total item signal which is a signal concerning the total item number in a record contained in the total item number containing zone 13 shown in FIG. 2 and which is delivered to a memory 36 for storing the number of items in one record. Such total item signal may be derived from a total item circuit 39 which may comprise a gate circuit 38 to which is applied, as gate signal, the output of a total item number containing zone detector circuit 37, which continues to provide a high-level signal for a period of time during which the total item number containing zone 13 is being read out.

The total item number containing zone detector circuit 37 may be designed such that it detects a signal pre-recorded in the zone 13 within the memory 11 to enable such zone to be identified, or that it effects detection for a predetermined length of time after the record index zone 2 has passed.

A further signal is an end-of-record signal which informs that reading out of one record has come to an end. Such end-of-record signal may be derived from an end-of-record detector circuit 40 which stores the total item number derived from the total item circuit 39 and substracts 1 from the so stored total item number each time a signal is applied from the end-of-item detector circuit 33, and which provides a pulse signal when the number of item signals delivered is coincident with the stored total item number.

The aforementioned item signal is applied through the AND gate 41, to the other input terminal of which is applied the output of the line 32 through an inverter 42.

Thus, whenever a coincidence signal is derived from the line 32, the application of the item signal to the item counter 35 is blocked so that the item counter is held in a state wherein that item number for which the coincidence signal has been obtained remains stored.

Such comparator 29, item counter 35 and memory 36 are reset by a reset signal generated at the position of the next record index signal after retrieval of one record has been terminated. Designated by 43 is a record memory having a sufficient capacity to accommodate therein at least one record and which stores one record read out from the memory 11 onto the line 26. If, at the end of reading of a certain record, a coincidence signal is being applied from the comparator 29 to the control portion 16, the coincidence is stored by the command circuit 44 and derived on a line 45 to interrupt the reading of the information from the reader 24 (such reading is continued if no output is provided from the command circuit 44), and also the output for one record from the record memory 43 is indicated by a line 46. The command circuit 44 is reset upon detecting that the information from a memory 55 to be described has been led into an output device or that a predetermined time has passed after the output from an AND gate derived. to be described has been deribed.

As soon as said indication takes place, the reading of the stored information from the record memory 43 starts in the order of storage and the read output is derived on lines 26 and 47 (line 26 being of bidirectionality) and applied to a record decoder circuit 28, which provides the item signal only. This may be accomplished by making such a design that all the other output lines than the output line for the item signal are cut off by the output of the command circuit 44.

It will be recalled that, for such readng, the comparator 29, item counter 35 and memory 36 are first reset by the record index signal read out from the second record memory 43.

Part of such output from the record memory 43 is further applied to an AND gate 53, to the other port of which is applied the output from a comparator 54, from which information for a period of time during which the coincidence output from the comparator 54 is present (the period of time corresponding to answer information) is applied to a memory 55 for containing the answer item.

Such design, however, would cause even the information in the character number containing zone to be also applied to the memory 55, but this may be solved by making such a design that the place allotted for the character containing zone is not read out when information is being read out from the memory 55, whereby the information read out from the memory 55 may correspond to each item having excluded the character number containing zone therefrom. Now, a circuit block encircled by broken line 56 is a weight discrimination circuit for indicating the item number in a certain record to be produced as an answer, and such circuit is constructed as will be described below.

At the end of a record, the item counter 35 has stored therein an item number in which the information coincident with the interrogation is present, and such number is imparted to the other end of an AND gate 58 having one end to which the end-of-record signal has been applied from a line 57, the output of such AND gate 58 being in turn introduced into "0" detection circuit 59. The "0" detection circuit 59 decides whether said item number is 0 or not, and produces a "0" signal or a non-"0" signal depending on the item number. The non-"0" signal is applied to a gate circuit 61 to which has been applied the output of a "0" generator 60 producing a "0" signal, the output of the "0" generator 60 is applied through the gate circuit 61 to an OR gate 62. The "0" signal from the discriminator circuit is applied to gate 63 to which the output of the memory 36 has also been applied and the output of the gate 63 is applied to the OR gate 62.

The output of the OR gate 62 is applied to a latch circuit 64 to cause the "0" signal from the "0" generator 60 or the total item signal from the memory 36 (this latter signal being coincident with the item number of that item which contains the account number) to be stored in the latch circuit 64.

A load signal imparted to the latch circuit 64 by a line 65 is formed by the aforesaid end-of-record signal being applied to a delay circuit 66. The retardation time of the delay circuit may be a very short time sufficient to permit the output of the OR gate 62 to be applied to the latch circuit 64 after the end-of-record signal has been applied to the AND gate 58. The weight discrimination circuit 56 is a circuit for causing the memory 55 to contain the item contained in the last place of a certain record after the end of record retrieval, namely, the account number item coincident with the number contained in the total item number containing zone in FIG. 2, when the information having the most significant weight in that record (i.e. the information of item No. 0) has been detected, or for causing the memory 55 to contain the information having the most significant weight of a certain record after the end of record retrieval, namely, the information corresponding to item No. 0. In other words, the weight discrimination circuit 56 is a circuit for detecting the weight of the detected information and determining the information to be derived.

The information retrieving apparatus according to the present invention is constructed as described hitherto, and operation thereof will now be described for a better understanding of the invention.

For the purpose of concreteness, the ensuing description will be made with respect to a case where all types of information as shown in Table 1 are contained within the memory in the order as exemplarily shown in FIG. 2 and the interrogation to be entered is "ANN J. KENNEDY".

Further, it is to be understood that retrieval of information within the memory 11 commences with the first record.

Now, when the interrogation "ANN J. KENNEDY" is entered from the input device 15, this information is passed through the decision circuit 17 in the control portion 16 and contained in the interrogation memory 19. Next, when a retrieval command is applied from the input device 15, a signal appears on the line 20 through the decision circuit 17 in the control portion to enable the AND gate 21 to permit the interrogation in the interrogation memory 19 to be transferred into the interrogation memory 22.

At the same time, in response to the record address command signal and the read command signal from the lines 25 and 23, the reader 24 reads out the information within the memory 11 and causes the record number "1" to be stored in the reader 24 while causing the reading out of the information within the memory 11 to be started from the record 1.

The index signal contained in the first place of the record 1 is decoded by the record decoder circuit 28, the output of which clears the comparator 29, the item counter 35 and the memory 36. Subsequent to the index, the total item number "2" (which is the actual number 3 minus 1, because the count commences from 0) is likewise contained into the memory 36 through the record decoder 28.

Next, in synchronism with the first character information in the 0 item, a comparison start command signal is applied to the comparator 29 while a read continuation command signal is applied to the interrogation memory 22.

Thus, the comparator 29 compares the characters "ANN J. KENNEDY" applied from the line 26 with the characters "ANN J. KENNEDY" applied from the memory 22 and decides whether they are coincident or not when the result decision command signal derived from the last of the 0 items has been applied from the line 50 to the comparator 29. The coincidence signal resulting therefrom is derived on the line 32 and the address reset signal is also applied to reset the interrogation to its initial condition within the memory 22.

Such coincidence signal is delivered to the command circuit in the control portion 16, where it is held, and a signal resulting from this coincidence signal is applied through an unshown circuit to the record decoder circuit 28 to cut off the output lines so as to prevent the output lines 49–52 from providing any output, so that any command signal is no longer derived even if the reading is thereafter continued from the first to the second item by the reader 24. Also, at this time, the item counter is counting "0", but the item counter 35 does not step any further because the said coincidence signal is applied to the AND gate 41 through the inverter 42. However, it will be apparent that the contents of the record so read out are stored in the record memory. When the reader 24 completes the reading out of the first record from the memory, there is derived an end-of-record signal informing that the retrieval of the first record has come to an end.

Such end-of-record signal is applied to the AND gate 58, whereby the content "0" of the item counter 35 is applied to the "0" detection circuit 59, which provides a "0" signal to enable the gate 63, thus permitting the total item signal "2" within the memory 36 to be applied through the OR gate 62 to the latch 64.

The latch 64 is loaded with the number "2" by a load signal comprising the end-of-record signal passed through the delay circuit 66, and the output thereof is applied to the comparator 54.

The derivation of such load signal is detected and the output signal resulting therefrom is derived on the line 45 of the command signal 44 in the control portion 16, so that the contents of the record memory 43 are successively produced to the AND gate 53 and the line 26.

Concurrently with the application of such output signal, an output signal is applied to the record decoder circuit 28 through a line 67, to control the record detector 28 so as to derive the item signal only.

Accordingly, the index signal from the record memory 43 is detected by the record decoder circuit 28 to clear the contents of the item counter 35 and the memory 36.

Next, when the leading item signal from the record memory 43 is delivered, the item counter 35 assumes "0" and the "0" output is applied to the comparator 54. Since the latch has "2" contained therein, no output is provided from the comparator 54 while the counter 35 counts the item signal generated upon shift to the next item (the first item) as read out from the record memory 43, and thus the contents thereof are now "1", whereafter reading out of the first item is started.

Even under such conditions, no output is provided from the comparator 54, and the item signal generated upon shift to the second item is applied from the record decoder 28 to the item counter 35, which now assumes "2", and such numerical value is applied to the comparator 54, which applies a signal to the AND gate 53 since said numerical value is coincident with the contents of the latch 64, and thus, "12345" which is the information about the second item is transferred in that form from the record memory 43 to the memory 55 through the AND gate 53.

The contents of the memory 55 are read out by an output command signal being applied to the memory 55 through a line 69-1 derived from the control portion 16 to which is applied the signal informing that the output of the record memory 43 has come to an end, and are then applied through the control portion 16 to the output device 69 comprising an indicator or a printer, from which those contents are produced.

A signal informing that the output from the output device 69 has come to an end is generated, whereupon a read command signal is again applied to the reader 24 to start retrieval of the second record.

The interrogation memory 22 holds the previous interrogation as it is, while the contents of the item counter 35, the memory 36 and the comparator 29 are cleared by the index signal in the second record, and these circuits, including the record decoder circuit 28, operate in the same manner as described in connection with the retrieval of the first record. Thus, retrieval of the second record takes place from the 0th item in succession, but since the information which is the second item corresponding to "ANN J. KENNEDY" is contained in the first item of the second record, there is stored "1" in the item counter 35 and "3" in the memory 36 at the end of the retrieval of the second record.

Thus, in the same manner as already described, the contents "1" of the item counter 35 are applied to the "0" detection circuit 59 by the application of the end-of-record signal informing that the retrieval of the second record has come to an end, whereas unlike the case of the first record, a non-"0" signal is now applied to the gate 61 and a "0" signal from the "0" generator 60 is applied to the latch 64, which is enabled to contain this signal therein by a load signal.

Therefore, if the contents of the second record contained in the record memory 43 by the output signal applied from the line 45 to the record memory 43 are successively produced and applied to the AND gate 53 and the record decoder circuit 28, it is detected that such output is coincident with the retrieval start record signal read out from the record by the reader 24 which has so far been stored, and an end-of-file signal is applied through the line 27 to the control portion 16, the signal from which stops all operations of the retrieving apparatus.

The information retrieving apparatus of the present invention, as has been described in detail, determines the weight of the item in one record which corresponds to an interrogation and, as a result of such decision, selects the information in that record to be produced so that the interrogator can easily recognize whether the answer is truly reliable or not, and whether or not a further inquiry should be made. This means greater ease with which the retrieving apparatus of the present invention is used.

We claim:

1. An information retrieving apparatus comprising:
   memory means for storing a plurality of records, each of said records including a plurality of items of information having different assigned weights;
   reading means for reading out the records stored in said memory means;
   input means for receiving interrogation information;

comparing means coupled to said reading means and to said input means for detecting coincidence between the output from said reading means and said interrogation information, and having an output for providing a signal when coincidence is detected;

discrimination means coupled to said comparing means output for determining the respective weights of items of information in response to coincidence signals; and selector means coupled to said discrimination means for selecting particular items of information from said records in accordance with the weights of said coincident items of information.

2. An information retrieving apparatus according to claim 1, wherein said assigned weights are determined by respective locations in said memory means of the items of information.

3. An information retrieving apparatus according to claim 1, wherein said comparing means comprises a memory operative to store the interrogation information, and a comparator circuit coupled to said memory and to said reading means for providing said coincidence signal when the contents of said memory coincides with the output from said reading means.

4. An information retrieving apparatus according to claim 1, wherein said discrimination means comprises a counter operative to store the location of the coincident items of information in said records, and weight detection means coupled to said counter for detecting the weight of the coincident items of information in accordance with said location.

5. An information retrieving apparatus according to claim 1, wherein said discrimination means includes means for determining the location of said particular items of information in accordance with the weights of said coincident items, and said selector means comprises converter means coupled to said location determining means for selecting said particular items of information from said records.

6. An information retrieving apparatus according to claim 1, wherein said memory means provides signals associated with and representative of the indices of each of said records; signals associated with and representative of the number of said items of information contained within each of said records; and signals, associated with each of said items of information, representative of the number of characters contained within said associated items of information.

7. An information retrieving apparatus comprising:
memory means for storing a plurality of records, each of said records including a plurality of items of information having a predetermined order of arrangement in accordance with weights assigned thereto;

reading means for reading out the records stored in said memory means;

input means for receiving interrogation information;

comparing means coupled to said reading means and to said input means for detecting coincidence between the output from said reading means and said interrogation information, and having an output for providing a signal when coincidence is detected;

counting means coupled to said reading means for counting the number of items of information read by said reading means;

location memory means coupled to said counting means for halting the count of said counting means in response to said coincidence signal, said location memory means storing the counted number of coincident items of information;

weight detection means coupled to said counting means for detecting the weight of said coincident items of information in accordance with said counted numbers; and selector means coupled to said weight detection means for selecting items of information from said records in accordance with the detected weights.

8. An information retrieving apparatus according to claim 7, wherein said weight detection means comprises means for producing a first signal in response to a predetermined numerical value contained in said counting means, and for producing a second signal in response to a value other than said predetermined value contained in said counting means.

9. An information retrieving apparatus according to claim 8, wherein said selector means comprises means for converting the numerical value in said counting means into a particular number in response to said first signal when said value equals said predetermined numerical value, and for converting said value in said counting means into still another particular number in response to said second signal when said value does not equal said predetermined numerical value, and means coupled to said converter means for selecting from said records the information which corresponds to the number derived from said converter means.

10. An information retrieving apparatus according to claim 9, wherein said selector means further comprises means for storing the information read out by said reader over at least one record, latch means for storing the number derived from said converter means, a comparator for comparing information detected from said read out information storing means with the contents of said latch means, and means for selecting, according to the output from said comparator, the item of information from said read out information storing means corresponding to the number derived from said converter means.

* * * * *

UNITED STATES PATENT OFFICE
CERTIFICATE OF CORRECTION

Patent No. 3,992,700          Dated November 16, 1976

Inventor(s) Tamotu Nakazawa, et al.

It is certified that error appears in the above-identified patent and that said Letters Patent are hereby corrected as shown below:

Column 2, line 55, after "usually" insert --carried--.

Column 3, line 11, change "portion" to --person--.

Column 3, line 43, change "having" to --being--.

Column 3, line 58, change "arrows" to --arrow S--.

Column 5, line 61, change "end-of-time" to --end-of-item--.

Column 6, line 40, change "zone 2" to --zone 12--.

Column 7, lines 11-12, delete both lines and insert: --from an AND gate 53 to be described has been derived.--.

Column 7, line 20, after "output line" insert --48--.

Column 9, lines 46-47, change "detector" to --decoder--.

Signed and Sealed this

Fifteenth Day of March 1977

[SEAL]

Attest:

RUTH C. MASON  
*Attesting Officer*

C. MARSHALL DANN  
*Commissioner of Patents and Trademarks*